US007429067B1

(12) United States Patent
Rosa

(10) Patent No.: US 7,429,067 B1
(45) Date of Patent: Sep. 30, 2008

(54) LIGHT STRING MOUNTING APPARATUS AND METHOD OF USE THEREOF

(76) Inventor: Linda S. Rosa, 14379 W. Farm Road 194, Billing, MO (US) 65610

( * ) Notice: Subject to any disclaimer, the term of this patent is extended or adjusted under 35 U.S.C. 154(b) by 42 days.

(21) Appl. No.: 11/595,009

(22) Filed: Nov. 9, 2006

Related U.S. Application Data

(60) Provisional application No. 60/734,439, filed on Nov. 9, 2005.

(51) Int. Cl.
*B25J 1/00* (2006.01)

(52) U.S. Cl. ...................................... 294/19.1; 248/303

(58) Field of Classification Search ................ 294/19.1, 294/24, 26; 248/215, 303, 339
See application file for complete search history.

(56) References Cited

U.S. PATENT DOCUMENTS

| | | | | | |
|---|---|---|---|---|---|
| 579,675 | A | * | 3/1897 | Glover | 294/24 |
| 674,190 | A | * | 5/1901 | Zeiler | 15/147.2 |
| 1,361,056 | A | * | 12/1920 | Hickman | 248/215 |
| 2,488,396 | A | * | 11/1949 | Gottholm | 294/2 |
| 2,747,079 | A | * | 5/1956 | Kubiliunas | 362/398 |
| 3,240,463 | A | * | 3/1966 | Cook | 248/339 |
| 4,764,128 | A | | 8/1988 | Cheng | |
| 5,141,192 | A | | 8/1992 | Adams | |
| 5,303,885 | A | * | 4/1994 | Wade | 248/59 |
| D346,735 | S | | 5/1994 | Glisch et al. | |
| 5,553,905 | A | * | 9/1996 | Bentivegna | 294/24 |
| 5,560,975 | A | * | 10/1996 | Casper | 428/99 |
| 6,186,644 | B1 | | 2/2001 | Mosseau | |
| 6,352,291 | B1 | * | 3/2002 | Tortajada | 294/24 |
| 6,364,266 | B1 | * | 4/2002 | Garvin | 248/303 |
| D469,682 | S | | 2/2003 | Gary et al. | |
| 6,572,062 | B1 | | 6/2003 | Limber et al. | |
| 6,585,394 | B2 | | 7/2003 | Diaco | |
| 6,644,836 | B1 | | 11/2003 | Adams | |
| 6,652,013 | B1 | * | 11/2003 | Peterson | 294/19.1 |
| D492,890 | S | * | 7/2004 | Adams | D8/367 |
| 6,827,379 | B2 | | 12/2004 | Hill et al. | |

* cited by examiner

*Primary Examiner*—Dean J Kramer
(74) *Attorney, Agent, or Firm*—Robert C. Montgomery

(57) ABSTRACT

A system and method by which light strings can be quickly attached to and detached from the exterior of buildings is herein disclosed. A specialized hook is mounted onto a gutter, roofline, window, or other such similar position. The device consists of an elongated pole with an open-ended, frusto-conical end piece, threadably attached thereto. Nestled within the open-ended end piece is a serpentine-shaped hook for grasping light strings and maneuvering them onto the specialized hook.

3 Claims, 2 Drawing Sheets

LIGHT STRING MOUNTING APPARATUS AND METHOD OF USE THEREOF

RELATED APPLICATIONS

The present invention was first described in U.S. Provisional Patent Application No. 60/734,439 filed on Nov. 9, 2005.

FIELD OF THE INVENTION

The present invention relates generally to a system and method by which light strings can be quickly attached to and detached from the exterior of a structure and, more particularly, to a structure-mounted specialized hook; an elongated pole with a frusto-conical end piece threadably attached device; and, a serpentine-shaped metal hook for grasping light strings for maneuvering onto the specialized hook that is nestled within the open-ended end piece of the pole device.

BACKGROUND OF THE INVENTION

One holiday season tradition that many people enjoy and take great pride in is the decorating of the exterior of one's home with festive lights. While all types of lights, from standard colored lights to flashing lights, sequential lights, and even icicle lights are available to choose from, the one thing they all have in common is that the user must typically climb a ladder to place them any higher than 6-8 feet off of the ground. Of course, decorative light strings are often used on homes and commercial establishments at other times of the year. Climbing a ladder under ideal conditions is a safety issue for many, and when climbing in conditions that may include cold, snow, and ice, an accident is all but inevitable. Such climbing is also out of the question for those who may be elderly or handicapped.

The invention solves the aforementioned problem by means of a system and method by which holiday lights are quickly attached to and detached from a structure such as a house. The invention consists of two parts. The first part is a permanent hook that is attached to the structure. It is envisioned that different formats of the permanent hook would be provided for attaching to gutters, along roof lines, around windows and doors, along porches, on wall corners, and the like. Once installed, the user would never have to climb a ladder again to install holiday lights. The second part of the invention is a specialized hook, which would attach to the end of a common extension pole that is typically used while painting or trimming trees. The specialized hook allows the user to hold the string of lights, place them within the permanent hook, and then release the string, all while safely standing on the ground. In a similar manner, the process can be reversed when removing the lights after use.

Several attempts have been made in the past to assist users in mounting and stringing decorative light strings along roof lines, gutters, and other elevated positions. U.S. Pat. No. 6,585,394, issued in the name of Diaco, discloses an outdoor light string support system for organizing and supporting light strings beneath the eave of a building, wherein a plurality of bulbs are suspended from a support member themselves supported from apertures of a device attached to the eave of a building. The Diaco device does not disclose a means or device to elevate the light strings to a support device as in the present invention.

U.S. Pat. No. 6,186,644, issued in the name of Mosseau, describes a decorative lighting system with a light string mounting channel, wherein a string of lights is mounted within an extruded plastic channel with the light sockets engaged in apertures and the entire device mounted within a window. Inasmuch as the Mosseau device is designed for interior mounting of a device to hold light strings and does not provide for a means to raise a light string for elevated mounting, the present invention teaches a different apparatus and therefore does not fall under the scope of the Mosseau device.

U.S. Pat. Nos. 5,141,192 and 6,644,836, both issued in the name of Adams, disclose a hook apparatus for hanging cords or light strings from a gutter or the like. The Adams devices suffer from the same shortcomings as the previously mentioned prior art in that neither provides for a device to assist in hanging such light strings from support members.

U.S. Pat. No. 6,572,062, issued in the name of Limber et al., describes a gutter clip for attachment of linear systems. The clip device engages the gutter and has means for retaining light strings, misting systems, and the like. The function is similar to the Adams designs, but also does not provide light string mounting assist means.

U.S. Pat. No. 4,764,128, issued in the name of Cheng, teaches a distribution hanger for decorative light strings, comprising a distribution box for distributing light string sets, a power inlet plug, conductor wires providing a plurality of outlet sockets, and a hanging hook. Unfortunately, the Cheng device merely provides a device that gathers light strings in an organizer-type box without providing means to mount the light strings at an elevated location with a specialized device.

U.S. Pat. No. 6,827,379, issued in the name of Hill et al., discloses an apparatus for deploying decorative wiring upon elevated locations, comprising an elongated pole, accessory tools for mounting gutter clips, said gutter clips having adhesive backing and barbs for attachment to a gutter, a prong-type device for grasping the clips, and tool arms for engaging the wiring. The Hill et al. device is cumbersome to use with specialized and extravagant accessory designs and involves multiple changes of said accessories to mount the wiring. Additionally, the clip system utilizes a different fastening mechanism than does the present invention.

Additionally, various patents have been issued based on an ornamental design for gutter hooks or other string light supporting systems, notably D 492,890 issued in the name of Adams, D 469,682 issued in the name of Gary et al., and D 346,735 issued in the name of Glisch et al.

None of the prior art particularly describes a specialized device for grasping a light string and placing it on a plurality of pre-installed hooks. Accordingly, there is a need for a means by which decorative exterior light strings can be quickly and easily installed without resorting to climbing a ladder.

SUMMARY OF THE INVENTION

In view of the foregoing disadvantages inherent in the prior art, it has been observed that there is need of a means and method for mounting decorative light strings at elevated locations of a structure.

It has further been observed that there is a need for a device that is lightweight and easy to use.

The object of the present invention is to provide an elongated pole handle portion, being cylindrical in shape and sized to reach most construction building roof lines and preferably lightweight and sturdy, further comprising a top end that has male threads formed circumferentially thereupon.

Another object of the present invention is to provide a frusto-conical end piece having a top end and a bottom end, said bottom end having female threads formed circumferentially thereupon for engaging said male threads of said elongate pole handle, and said end piece comprising an inner wall defining a bore.

Yet another object of the present invention is to provide a serpentine hook, preferably fabricated out of a thin diameter of treated metal, further comprising an elongated curved end that is slightly longer to securely rest within said bore, located at said top end of said end piece, an upper curved end, and a well sized to grasp and retain a conventional light string and bulbs.

Still yet another object of the present invention provides for a specialized gutter hook for installation onto an exterior of a building for permanently retaining a light string, preferably fabricated out of a thin diameter of galvanized or otherwise treated metal, further comprising an upper hook member and a lower hook member, said upper hook member comprises a vertical section and a loop for receiving a mechanical attachment device such as a nail, staple, or screw, for securing said gutter hook to a gutter or similar elevated location of a structure and said lower hook member is "S"-shaped wherein a distal end curves backward towards said vertical portion of said upper hook member to create a channel wide enough to receive a main wire of conventional light strings or, alternatively, securing non-conventional light strings such as icicle light strings.

Another object of the present invention is to provide a length-adjusting means for said elongated pole.

To achieve the above and other objectives, a method for utilizing the present invention comprises the steps of: affixing the specialized gutter hook thereto an elevated location of a structure such as a gutter, eave, or roofline by placing a mechanical fastener therethrough said loop of said upper hook member; affixing additional gutter hooks at equidistant locations of said elevated locations; threading said end piece onto said elongated pole; placing said serpentine hook therewithin said end piece by placing said elongated curved end of said serpentine hook into said bore; grasping a portion of said light string by retaining said light string within said well of said serpentine hook, such that said upper curved end helps to retain light string within said well; raising said elongated pole with said light string retained within said serpentine hook up to said gutter hook; attaching said light string onto said gutter hook by manipulating said light string through said channel of said lower hook member and removing said serpentine hook from said light string; and, repeating said attachment process until said light string is entirely supported thereon said gutter hooks.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY

Figure 1:
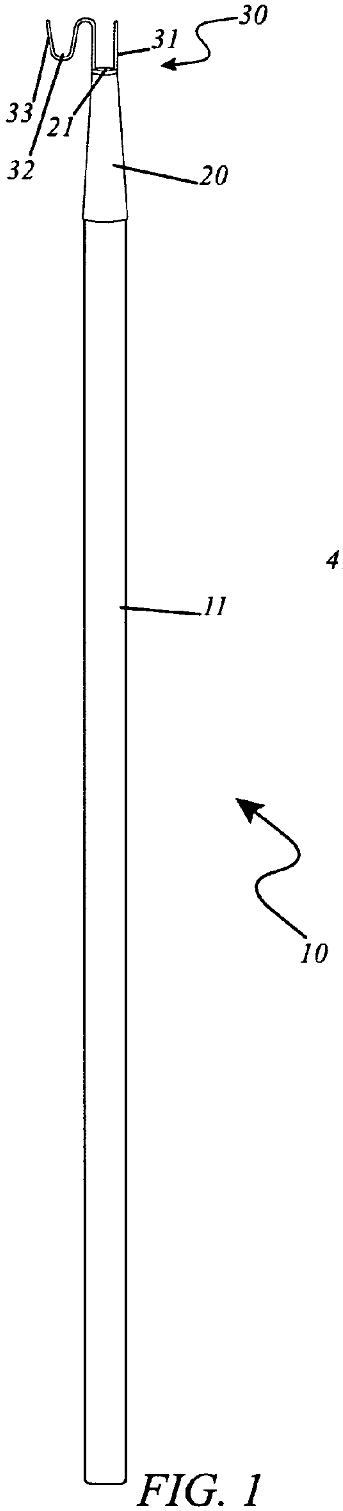
FIG. 1 is an front elevation view of a light string mounting device 10, according to a preferred embodiment of the present invention; and, FIG. 2 is a close-up view of the light string mounting device 10 attachably removed therefrom the elongated pole handle 11, according to a preferred embodiment of the present invention; and, FIG. 3 is a front elevation view of the specialized gutter hook 40, according to a preferred embodiment of the present invention; and, FIG. 4 is a perspective view of the light string mounting device 10 attachably removed therefrom the elongated pole handle 11, according to a preferred embodiment of the present invention; and, FIG. 5 is an environmental view of the light string mounting device 10, operably mounting a light string 50 thereupon a series of specialized gutter hooks 40, mounted on a gutter 51 of a structure 52.

| | |
|---|---|
| 10 | light string mounting device |
| 11 | elongate pole handle |
| 12 | threaded end |
| 20 | end piece |
| 21 | upper opening |
| 22 | lower threaded opening |
| 30 | serpentine hook |
| 31 | elongated curved end |
| 32 | well |
| 33 | upper curved end |
| 40 | specialized gutter hook |
| 41 | upper hook member |
| 42 | lower hook member |
| 43 | hook channel |
| 50 | light string |
| 51 | gutter |
| 52 | structure |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method that aids in the attaching and detaching of holiday light strings 50 to and from the exterior of buildings 52, and at locations such as a gutter 51, eave, or roofline. The light string mounting device, and system of use thereof 10, comprises an elongated pole handle portion 11, a frusto-conical end piece 20, a serpentine hook 30, and a specialized light string hook 40. The hooks 30, 40 are envisioned to be fabricated from plastic in an injection molding process or could be fabricated from sheet steel in a stamping process. Such processes would require the design and use of custom molds and/or dies.

Figure 2:
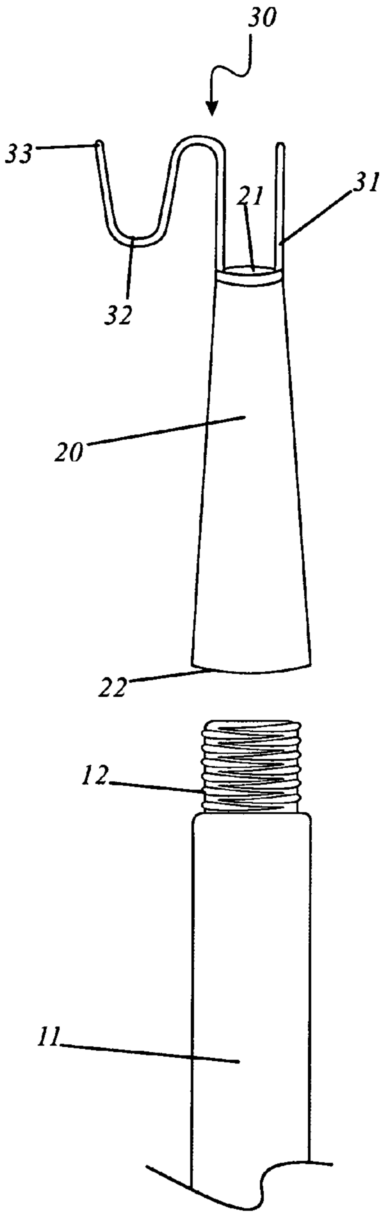
Figure 4:
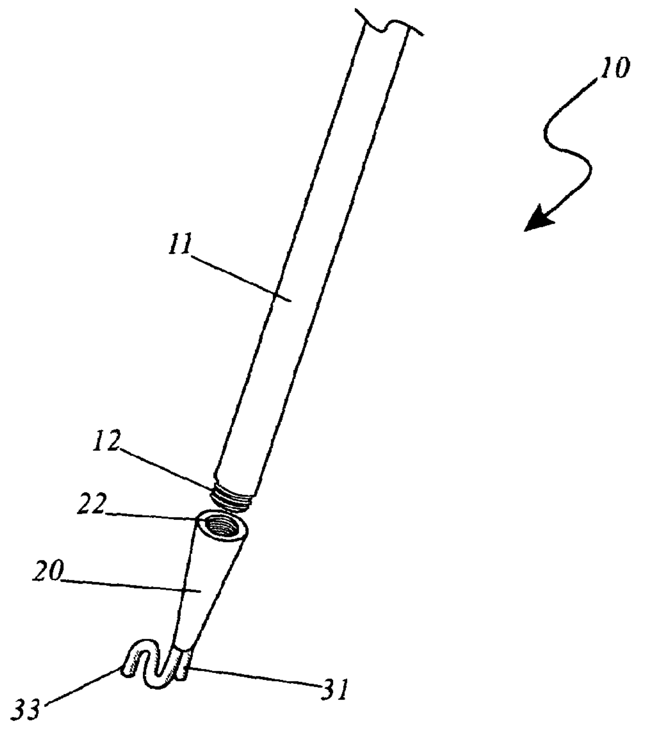

As depicted in FIGS. 1, 2, and 4, an elongated pole handle portion 11 is described as being cylindrical in shape and sized to reach most building 52 roof lines. The material of construction is preferably lightweight and sturdy and has a top end 12 that has male threads formed circumferentially thereupon. An end piece 20, generally of a frusto-conical shape, has female threads 22 formed within its larger diameter to engage the male threads of the elongated pole handle 11. Said end piece 20 is envisioned to be removably attachable for collectively engaging the male threads 12 formed therein. The end piece 20 is envisioned to comprise an inner wall, defining a bore to adaptably and correspondingly receive the outer, upper portion of the elongated pole handle portion 11, defining the female thread portion 12, thereby rotatably engaging the end piece 20 into place for secure placement. However, other fastening means may be utilized as adequate securement of the end piece 20 thereon the upper portion 12 of the elongated pole handle portion 11. The end piece 20 may be a molded or extruded plastic construction or metallic.

A serpentine hook 30, made out of a thin diameter of galvanized or otherwise treated metal, is generally "S"-shaped with an additional elongated curved end 31 that is slightly longer to securely rest within the open end 21 of the end piece 20. The upper curved end 33 is formed for receiving various sizes and shapes of wires to support various sizes and shapes of light strings 50 and bulbs. The elongated, curved end 31 of the serpentine hook 30 is envisioned to be frictionally received therein an opening incorporated at the upper portion of the end piece 20. The well 32 of the serpentine hook 30 must be deep enough to grasp and retain a conventional light string 50 and bulbs. A cord is passed through the open end 21, thus the string of lights 50 is suspended from the elongated pole 11. The pole 11 is then raised to a level just above a lower hook member 42 of a desired serpentine hook 30 to be released therein said lower hook member 42 so that the portion of the string of lights 50 is in contact.

Figure 3:
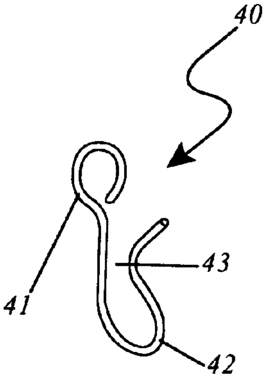

Referring now to FIG. 3, a specialized gutter hook 40 for installation on the exterior of a building 52 to permanently retain a light string 50, comprising a thin diameter of galvanized or otherwise treated metal with upper 41 and lower 42 hook member portions is herein disclosed. The upper hook member 41 is vertical until the end at which it forms a loop to receive a mechanical attachment device such as a nail, staple, or screw. The hook 40 is designed to be used in conjunction with multiple hooks formed to provide sufficient support to the entire length of the light string 50 attached thereto the lower hook member 42 with the upper hook member 41 attachably secured thereto the upper portion of a house, building 52, or other structure, typically at the gutter 51, eave, or roofline. The lower hook member 42 is generally "S"-shaped, wherein the distal end curves back and nearly abuts the vertical portion of the upper hook member 41, thereby creating a channel portion 43. The hook 40 includes an upper hook portion 41 that is securable via fasteners. The lower hook portion 42 includes a channel 43 for receiving the main wire of conventional light strings 50 or, alternatively, securing non-conventional light strings such as icicle light strings.

The channel 43 formed between the bottom of the upper hook member 41 and the curved portion of the lower hook member 42 must be of a diameter wide enough to permit the passage and retention of a light string 50. The hooks 40 may be equidistantly spaced or variously spaced therebetween with the lower hook member 42 utilized for supporting the light string 50 at a specified height above the ground. The lower hook member 42 is formed for receiving various sizes and shapes of wires to support various sizes and shapes of light strings 50 and bulbs. The installation of the light string 50 is achieved by positioning the wiring of the light string 50 within the lower hook portion 42, thereby supporting the string of lights 50 at a distance above the ground. Further, the upper hook member 41 is formed for receiving various sizes and shapes of fasteners suitable to support the string of lights 50.

Figure 5:
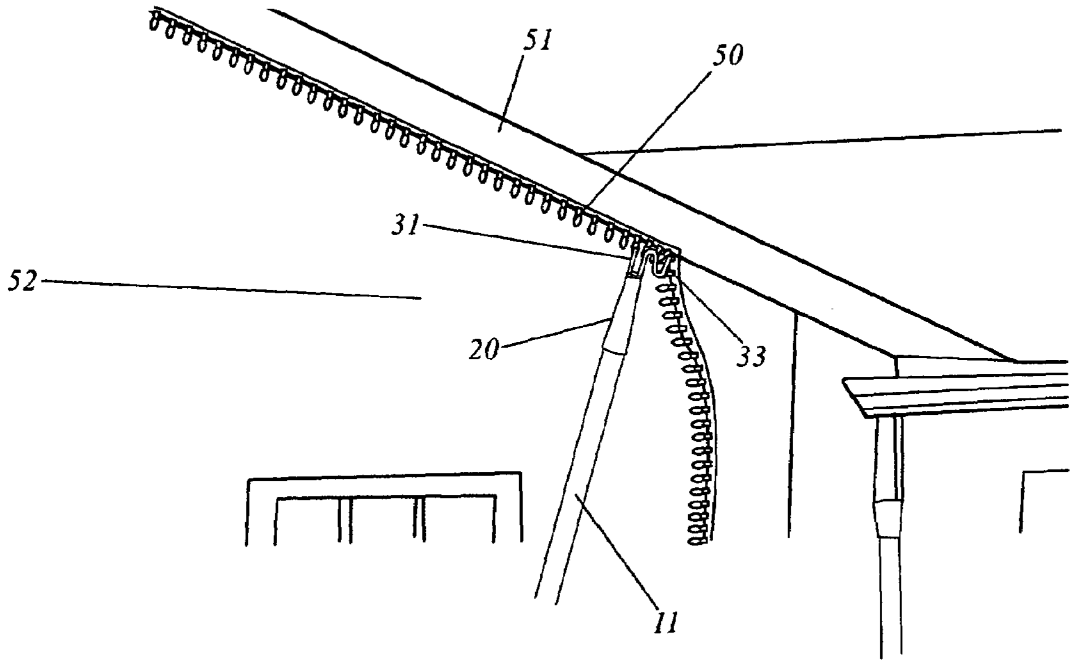

Referring finally to FIG. 5, an environmental view of the light string mounting device 10 operably mounting a light string 50 to a series of specialized gutter hooks 40 mounted on a gutter 51 of a building 52, is herein disclosed.

An alternate embodiment of the present invention may disclose an elongated pole 11 that is adjustably and fixedly extended and retracted, as needed, to suspend lights 50 at varying heights.

The preferred embodiment of the present invention can be utilized by the common user, who has little or no training, in a simple and effortless manner. After initial purchase or acquisition of the system 10, it would be configured as indicated in FIGS. 1 through 5.

The present system and method for installing light strings 10 and, more particularly, holiday lights around the gutters 51 or roof lines of structures 52 such as residential houses, involves an easy multi-step process. The specialized gutter hook 40, as shown in FIG. 3, must initially be attached to and equally spaced about the circumference of the structure. A ladder or other means to reach said locations may be required; the hook 40 merely attaches to the locations via nails, screws, staples, or any other affixing device through the upper hook member 41 and enough of these hooks 40 must be installed to ensure that the desired light string 50 can be properly secured upon the lower hook member 42.

Once the initial installation is completed, the user then threads the larger open ended side 22 of the frusto-conical end piece 20 onto the elongated pole 11. The serpentine hook 30 is then placed within the end piece 20 by placing the elongated, curved end 31 of the hook 30 into the open end 21. The light string mounting device 10 is then ready to grasp a portion of the desired light string 50 by retaining the light string within the well 32 of the serpentine hook 30, such that the light string 50 does not fall off of the upper curved end 33. Once the light string 50 is retained within the well 32 of the hook 30, it is ready for placement on the specialized gutter hooks 40.

The present invention is extremely useful for placing and removing decorative light strings 50 during the holidays; a tedious and dangerous task many do not like to perform. Also, with the proper use of the light string mounting device 10, it is much easier to check and replace burned out or damaged bulbs. The system is modular in construction and can be easily stored away when not in use and is the perfect implement to install the light strings 50 in out-of-reach and elevated places where safety is a concern.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method by which to install and remove light strings from an elevated exterior location of a structure, comprising the steps of:

providing a device for grasping and installing said light strings to said location, comprising:

an elongated cylindrical pole handle, further comprising a top end that has male threads formed circumferentially thereupon;

a frusto-conical end piece having a top end and a bottom end, said bottom end having female threads formed circumferentially thereupon for engaging said male threads of said elongate pole handle, said top end having an opening defining a bore;

a serpentine hook, further comprising an elongated curved end to securely rest within said bore, an upper curved end, and a well; and, a specialized gutter hook, further comprising:

an upper hook member, said upper hook member comprises a vertical section and a loop for receiving a mechanical attachment device for securing said gutter hook to said elevated location of said structure; and, a lower hook member, said lower hook member is "S"-shaped wherein a distal end curves backward towards said vertical portion of said upper hook member to create a channel wide enough to receive a main wire of said light strings;

affixing said specialized gutter hook thereto said elevated location of said structure by placing a mechanical fastener therethrough said loop of said upper hook member;

affixing additional gutter hooks at equidistant locations of said elevated locations;

threading said end piece onto said elongated pole handle;

placing said serpentine hook therewithin said end piece by placing said elongated curved end of said serpentine hook into said bore;

grasping a portion of said light string by retaining said light string within said well of said serpentine hook, such that said upper curved end helps to retain said light string within said well;

raising said elongated pole with said light string retained within said serpentine hook up to said gutter hook;

attaching said light string onto said gutter hook by manipulating said light string through said channel of said lower hook member and removing said serpentine hook from said light string;

and, repeating said attachment process until said light string is entirely supported thereon said gutter hooks.

2. The method of claim 1, further comprising a specialized gutter hook for installation onto said elevated location of said structure for permanently retaining said light string, further comprising an upper hook member and a lower hook member, said upper hook member comprises a vertical section and a loop for receiving a mechanical attachment device for securing said gutter hook to said elevated location of said structure and said lower hook member is "S"-shaped wherein a distal end curves backward towards said vertical portion of said upper hook member to create a channel wide enough to receive a main wire of said light strings.

3. The method of claim 1, wherein said elevated location comprises a gutter, or roofline, or eavestrough.

* * * * *